(12) United States Patent
Sakai et al.

(10) Patent No.: US 10,895,719 B2
(45) Date of Patent: Jan. 19, 2021

(54) PROJECTION SYSTEM AND PROJECTOR

(71) Applicant: SEIKO EPSON CORPORATION, Tokyo (JP)

(72) Inventors: Toshihiko Sakai, Matsumoto (JP); Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 91 days.

(21) Appl. No.: 16/462,680

(22) PCT Filed: Nov. 9, 2017

(86) PCT No.: PCT/JP2017/040394
§ 371 (c)(1),
(2) Date: May 21, 2019

(87) PCT Pub. No.: WO2018/096934
PCT Pub. Date: May 31, 2018

(65) Prior Publication Data
US 2020/0081230 A1  Mar. 12, 2020

(30) Foreign Application Priority Data

Nov. 22, 2016  (JP) .................................. 2016-226674

(51) Int. Cl.
*G02B 13/16* (2006.01)
*G02B 15/14* (2006.01)
*G02B 13/18* (2006.01)

(52) U.S. Cl.
CPC ............. *G02B 13/16* (2013.01); *G02B 13/18* (2013.01); *G02B 15/1465* (2019.08)

(58) Field of Classification Search
CPC .... G02B 7/102; G02B 15/173; G02B 15/177; G02B 13/009; G02B 15/14
(Continued)

(56) References Cited

U.S. PATENT DOCUMENTS

| 7,190,528 B2 | 3/2007 | Inoko |
| 7,403,339 B2 | 7/2008 | Inoko |

(Continued)

FOREIGN PATENT DOCUMENTS

| JP | 2000-199849 A | 7/2000 |
| JP | 2006-234893 A | 9/2006 |

(Continued)

OTHER PUBLICATIONS

Jan. 30, 2018 International Search Report issued in International Patent Application No. PCT/JP2017/040394.

*Primary Examiner* — Mohammed A Hasan
(74) *Attorney, Agent, or Firm* — Oliff PLC (57) ABSTRACT

A projection system including seven lens groups sequentially arranged from an enlargement side, a first lens group having negative refractive power, a second lens group having positive refractive power, a third lens group having positive refractive power, a fourth lens group having negative refractive power, a fifth lens group having positive refractive power, a sixth lens group having positive refractive power, and a seventh lens group having positive refractive power, wherein vdR that is a dispersion value of a lens that forms the seventh lens group out of the seven lens groups and is closest to a reduction side and vdF that is a dispersion value of a lens that forms the first lens group out of the seven lens groups and is closest to the enlargement side satisfy a following conditional expression: 5<vdR−vdF<30.

20 Claims, 7 Drawing Sheets

(58) Field of Classification Search
USPC .......................................................... 359/695
See application file for complete search history.

(56) References Cited

U.S. PATENT DOCUMENTS

| | | | |
|---|---|---|---|
| 7,576,923 | B2 | 8/2009 | Inoko |
| 8,879,162 | B2 | 11/2014 | Yanai et al. |
| 2006/0187556 | A1 | 8/2006 | Inoko |
| 2007/0103793 | A1 | 5/2007 | Inoko |
| 2008/0231967 | A1 | 9/2008 | Inoko |
| 2012/0113312 | A1 | 5/2012 | Yanai et al. |
| 2013/0094095 | A1 | 4/2013 | Minefuji |
| 2015/0205082 | A1* | 7/2015 | Shiokawa .............. G02B 15/16 359/683 |
| 2019/0072838 | A1* | 3/2019 | Toyoda .............. G02B 27/0955 |

FOREIGN PATENT DOCUMENTS

| | | | |
|---|---|---|---|
| JP | 2012-226019 | A | 11/2012 |
| JP | 2013-088544 | A | 5/2013 |
| JP | 5535542 | B2 | 7/2014 |

\* cited by examiner

PROJECTION SYSTEM AND PROJECTOR

BACKGROUND

1. Technical Field

The present invention relates to a projection system suitable for incorporation in a projector and a projector that incorporates the projection system.

2. Related Art

JP-A-2006-234893 discloses a projection system which is formed of seven groups whose power (refractive power) is negative, positive, positive, negative, positive, positive, and positive sequentially from the magnifying side and in which the fifth group includes a lens having aspheric surfaces on opposite sides.

In a projection system having a seven-group configuration, however, it is not always easy to ensure a back focal length that allows a light combining prism to be added between the projection system and a display device and further allows a contrast compensation element or any other member to be inserted into the space between the projection system and the display device with sufficient brightness ensured so that the projection system is suitable for incorporation, for example, in a three-panel projector.

SUMMARY

An object of the invention is to provide a projection system that has a seven-group configuration and allows a long back focal length and a projector that incorporates the projection system.

An aspect of the invention, a projection system includes seven lens groups sequentially arranged from an enlargement side, a first lens group having negative refractive power, a second lens group having positive refractive power, a third lens group having positive refractive power, a fourth lens group having negative refractive power, a fifth lens group having positive refractive power, a sixth lens group having positive refractive power, and a seventh lens group having positive refractive power, and vdR that is a dispersion value of a lens that forms the seventh lens group out of the seven lens groups and is closest to a reduction side and vdF that is a dispersion value of a lens that forms the first lens group out of the seven lens groups and is closest to the magnifying side satisfy a following conditional expression:

$$5 < vdR - vdF < 30.$$

The projection system described above is formed of the seven lens groups whose refractive power is negative, positive, positive, negative, positive, positive, and positive from the enlargement side, and in the case where the dispersion value vdR of the lens closest to the reduction side in the seventh lens group and the dispersion value vdF of the lens closest to the enlargement side in the first lens group satisfy the conditional expression described above, negative refractive power of the entire projection system occurs in a portion shifted toward the enlargement side, whereby the back focal length can be increased.

According to another aspect of the invention, the sixth lens group is formed of a combination of a biconcave lens and a biconvex lens bonded to each other to form a doublet and a convex lens sequentially arranged from the enlargement side. In this case, the combination of the lenses described above allows suppression of chromatic aberrations resulting from zooming (change in magnification), a variety of aberrations, such as sagittal coma, and variation in telecentric.

According to another aspect of the invention, an absolute value of a focal length of the doublet in the sixth lens group is greater than 50 mm.

According to still another aspect of the invention, a lens closest to the enlargement side in the first lens group is an aspheric lens made of a resin. In this case, the configuration in which the lens closest to the enlargement side is an aspheric lens allows satisfactory correction of distortion across an entire zooming range. An aspheric lens made of a resin (plastic) is inexpensive and is highly flexible in terms of the shape of the aspheric surface and therefore allows optimum correction of distortion in accordance with the angle of view.

According to a still another aspect of the invention, the fifth lens group is formed of an aspheric lens made of glass. In this case, for example, spherical aberrations and coma flare can be suppressed.

According to a still another aspect of the invention, the first lens group and the seventh lens group are fixed when magnification is changed from a wide-angle end to a telescopic end, and the second lens group to the sixth lens group move in the change in magnification. In this case, the precision of the optical axis of the projection system is readily increased, whereby a high-quality projected image can be produced.

To achieve the object described above, a projector according to the invention includes the projection system described above.

The projector described above, which incorporates the projection system described above, allows an increase in the back focal length, whereby a cross dichroic prism, a contrast compensation element, and other members can be readily disposed in the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projection system according to an embodiment of the invention and a projector (projection-type image display apparatus) that incorporates the projection system will be described below with reference to the drawings.

Figure 1:
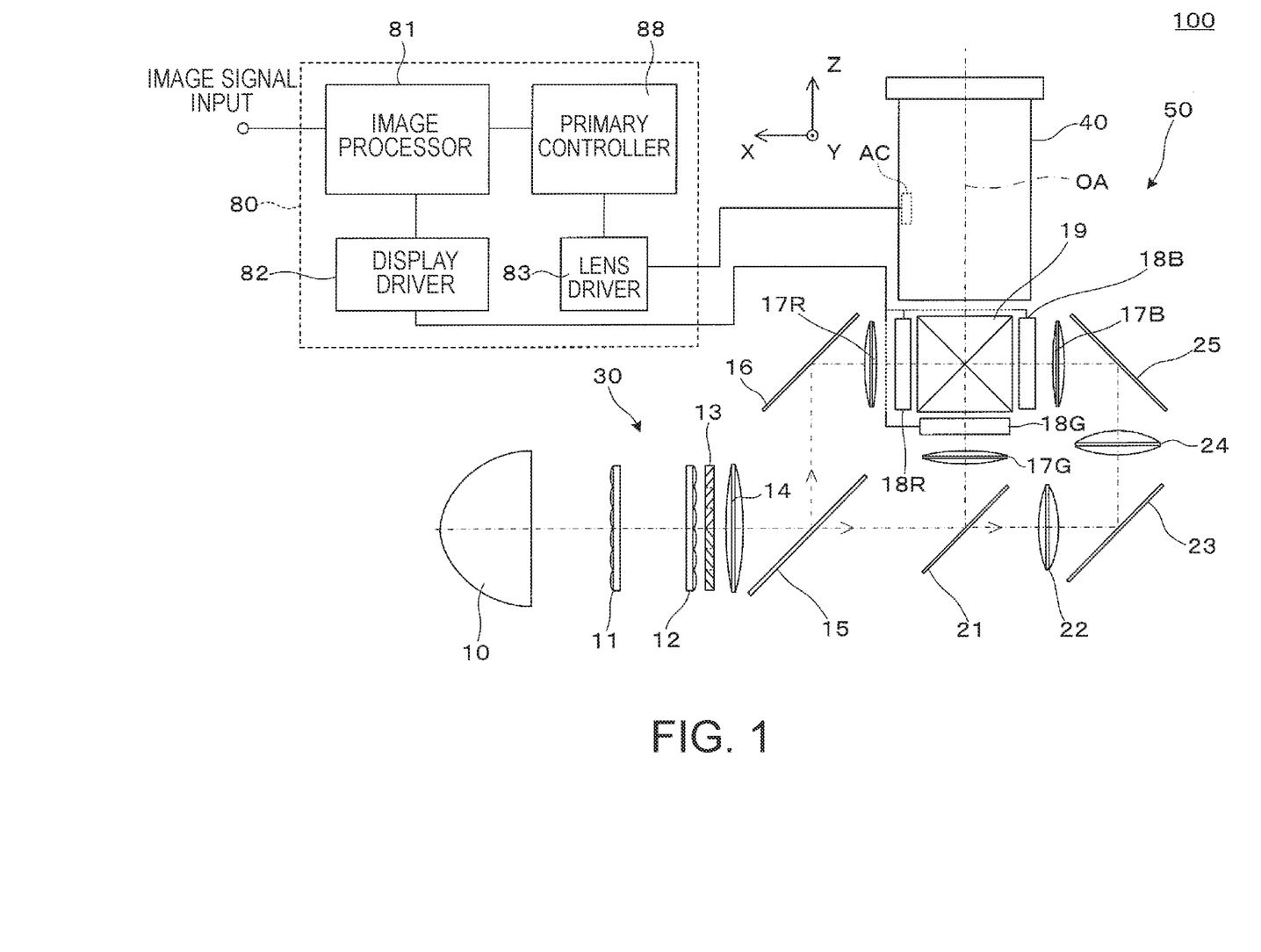
FIG. 1 shows a schematic configuration of a projector that incorporates a projection system according to an embodiment.

A projector 100, which incorporates the projection system according to the embodiment of the invention, includes an optical system section 50, which projects image light, and a circuit apparatus 80, which controls the action of the optical system section 50, as shown in FIG. 1.

In the optical system section 50, a light source 10 is, for example, an ultrahigh-pressure mercury lamp and emits light containing R light, G light, and B light. The light source 10 may instead be a discharge light source other than an ultrahigh-pressure mercury lamp or may be a solid-state light source, such as an LED and a laser. A first optical integration lens 11 and a second optical integration lens 12 each include a plurality of lens elements arranged in an array. The first optical integration lens 11 divides a light flux from the light source 10 into a plurality of light fluxes. The lens elements of the first optical integration lens 11 focus the light flux from the light source 10 in the vicinity of the lens elements of the second optical integration lens 12. The lens elements of the second optical integration lens 12 cooperate with a superimposing lens 14 to form images of the lens elements of the first optical integration lens 11 on liquid crystal panels 18R, 18G, and 18B. The configuration described above allows a display region of each of the liquid crystal panels 18R, 18G, and 18B to be entirely illuminated with the light from the light source 10 at substantially uniform brightness.

A polarization conversion element 13 converts the light from the second optical integration lens 12 into predetermined linearly polarized light. The superimposing lens 14 superimposes the images of the lens elements of the first optical integration lens 11 on one another on the display area of each of the liquid crystal panels 18R, 18G, and 18B via the second optical integration lens 12.

A first dichroic mirror 15 receives the R light, the G light, and the B light incident thereon from the superimposing lens 14, reflects the R light, and transmits the G light and the B light. The R light reflected off the first dichroic mirror 15 travels via a reflection mirror 16 and a field lens 17R and impinges on the liquid crystal panel 18R, which is a light modulation device. The liquid crystal panel 18R modulates the R light in accordance with an image signal to form an R image.

A second dichroic mirror 21 receives the G light and the B light having passed through the first dichroic mirror 15, reflects the G light, and transmits the B light. The G light reflected off the second dichroic mirror 21 passes through a field lens 17G and impinges on the liquid crystal panel 18G, which is a light modulation device. The liquid crystal panel 18G modulates the G light in accordance with an image signal to form a G image. The B light having passed through the second dichroic mirror 21 travels via relay lenses 22 and 24, reflection mirrors 23 and 25, and a field lens 17B and impinges on the liquid crystal panel 18B, which is a light modulation device. The liquid crystal panel 18B modulates the B light in accordance with an image signal to form a B image.

A cross prism (cross dichroic prism) 19, which is a prism for light combination (light combining prism), combines the light fluxes modulated by the liquid crystal panels 18R, 18G, and 18B with one another into image light and directs the image light to a projection system 40.

The projection system 40 is a zoom lens for projection that receives the image light formed of the light fluxes modulated by the liquid crystal panels 18G, 18R, and 18B and combined with one another by the cross prism (cross dichroic prism) 19 and enlarges and projects the image light on a screen that is not shown.

The circuit apparatus 80 includes an image processor 81, to which an external image signal, such as a video signal, is inputted, a display driver 82, which drives the liquid crystal panels 18G, 18R, and 18B provided in the optical system section 50 based on an output from the image processor 81, a lens driver 83, which activates a drive mechanism (not shown) provided in the projection system 40 to adjust the state of the projection system 40, and a primary controller 88, which oversees and controls the actions of the circuit sections 81, 82, and 83 and other components.

The image processor 81 converts the inputted external image signal into image signals each containing grayscales and other factors on a color basis. The image processor 81 can also perform a variety of types of image processing, such as distortion correction and color correction, on the external image signal.

The display driver 82 can operate the liquid crystal panels 18G, 18R, and 18B based on the image signals outputted from the image processor 81 to allow the liquid crystal panels 18G, 18R, and 18B to form images corresponding to the image signals or images corresponding to the images having undergone the image processing.

The lens driver 83 operates under the control of the primary controller 88 and can cause an actuator AC to move part of optical elements that form the projection system 40 as appropriate along an optical axis OA to perform change in magnification and focusing (zooming and focusing) in the projection of an image on the screen via the projection system 40. The lens driver 83 can also change the vertical position of an image projected on the screen through tilt adjustment in which the entire projection system 40 is moved in an upward/downward direction perpendicular to the optical axis OA.

The projection system 40 according to the embodiment will be specifically described below with reference to FIG. 2. The projection system 40 shown by way of example in FIG. 2 and other figures has the same configuration as that of a projection system 41 according to Example 1, which will be described later. It is assumed that a direction +Y is the upward direction and a direction −Y is the downward direction for convenience.

The projection system 40 according to the embodiment projects an image formed on the liquid crystal panel 18G (18R, 18B) on the screen, which is not shown. A prism PR, which corresponds to the cross dichroic prism 19 shown in FIG. 1, is disposed between the projection system 40 and the liquid crystal panel 18G (18R, 18B).

The projection system 40 is formed of the following seven lens groups sequentially arranged from the enlargement side: a first lens group G1 having negative refractive power; a second lens group G2 having positive refractive power; a third lens group G3 having positive refractive power; a fourth lens group G4 having negative refractive power; a fifth lens group G5 having positive refractive power; a sixth lens group G6 having positive refractive power; and a seventh lens group G7 having positive refractive power.

The first lens group G1 is a lens group having a three-lens configuration (lenses L11 to L13). Specifically, the first lens group G1 is formed of two negative lenses (lenses L11 and L12) and one concave lens (lens L13) sequentially arranged from the enlargement side. Among the lenses described above, the lens L11, in particular, which is the lens closest to the enlargement side, is an aspheric lens made of a resin. The configuration in which the lens L11, which is closest to the enlargement side and therefore tends to be the largest lens, is an aspheric lens allows satisfactory correction of distortion across an entire zooming range. An aspheric lens made of a resin (plastic) is highly flexible in terms of the shape of the aspheric surface and therefore allows optimum correction of distortion in accordance with the angle of view and can be manufactured at low cost particularly in the case of a large lens as compared with an aspheric lens made of glass. In the embodiment, the lens L11 has a characteristic M-letter shape as a result of optimization of the distortion correction, as shown in FIG. 2. The lens L11 having, for example, the M-letter shape is further configured to have relatively low power so that the thickness thereof in the optical axis direction does not greatly vary.

The second lens group G2 is a lens group having a three-lens configuration (lenses L21 to L23). Specifically, the second lens group G2 is formed of the combination of the following two lenses sequentially arranged from the enlargement side: a doublet C21, which is formed of a positive lens (lens L21) and a negative lens (lens L22) bonded to each other; and a single convex lens (lens L23).

The third lens group G3 is a lens group having a two-lens configuration (lenses L31 and L32). Specifically, the third lens group G3 is formed of a doublet C31, which is formed of a convex lens (lens L31) and a negative lens (lens L32) bonded to each other.

The fourth lens group G4 is a lens group having a one-lens configuration (lens L41). Specifically, the fourth lens group G4 is formed of a single concave lens (lens L41).

The fifth lens group G5 is a lens group having a one-lens configuration (lens L51). Specifically, the fifth lens group G5 is formed of a single positive lens (lens L51). The lens L51 is an aspheric lens made of glass (molded glass). The lens L51 made of glass can suppress, for example, spherical aberrations and coma flare. The lens L51, which is located in a position where the light ray flux has as a whole a relatively small size, can be formed as a relatively small-size lens.

The sixth lens group G6 is a lens group having a three-lens configuration (lenses L61 to L63). Specifically, the sixth lens group G6 is formed of the combination of the following two lenses sequentially arranged from the enlargement side: a doublet C61, which is formed of a concave lens (lens L61) and a convex lens (lens L62) bonded to each other; and a convex lens (lens L63). The configuration in which the sixth lens group G6 is formed of the combination of the lenses described above allows suppression of chromatic aberrations resulting from zooming (change in magnification), a variety of aberrations, such as sagittal coma, and variation in telecentric on the reduction side. To provide the effect described above, it is preferable to set the absolute value of the focal length of the double C61, in particular, at a value greater than 50 mm.

The seventh lens group G7 is a lens group having a one-lens configuration (lens L71). Specifically, the seventh lens group G7 is formed of a single convex lens (lens L71).

Out of the seven lens groups G1 to G7, it is assumed that the lens L71, which is the lens that forms the seventh lens group G7 and is closest to the reduction side, (that is, lens closest to the reduction side in projection system 40) has a dispersion value vdR, and that the lens L11, which is the lens that forms the first lens group G1 and is closest to the enlargement side, (that is, lens closest to the enlargement side in projection system 40) has a dispersion value vdF, and the projection system 40 satisfies the following conditional expression (1):

$$5 < vdR - vdF < 30. \quad (1)$$

The projection system 40 having the configuration described above allows negative refractive power (power) of the entire projection system 40 to occur in a portion shifted toward the enlargement side and therefore allows the back focal length to increase on the reduction side. Therefore, when the projection system 40 is incorporated in the projector, the cross-prism (cross dichroic prism) 19, a contrast compensation element that is not shown, and other members can be readily disposed in the projector, as shown in FIG. 2. Further, a substantially telecentric configuration can be achieved on the reduction side, whereby color unevenness on the projection screen can be suppressed.

Figure 3:
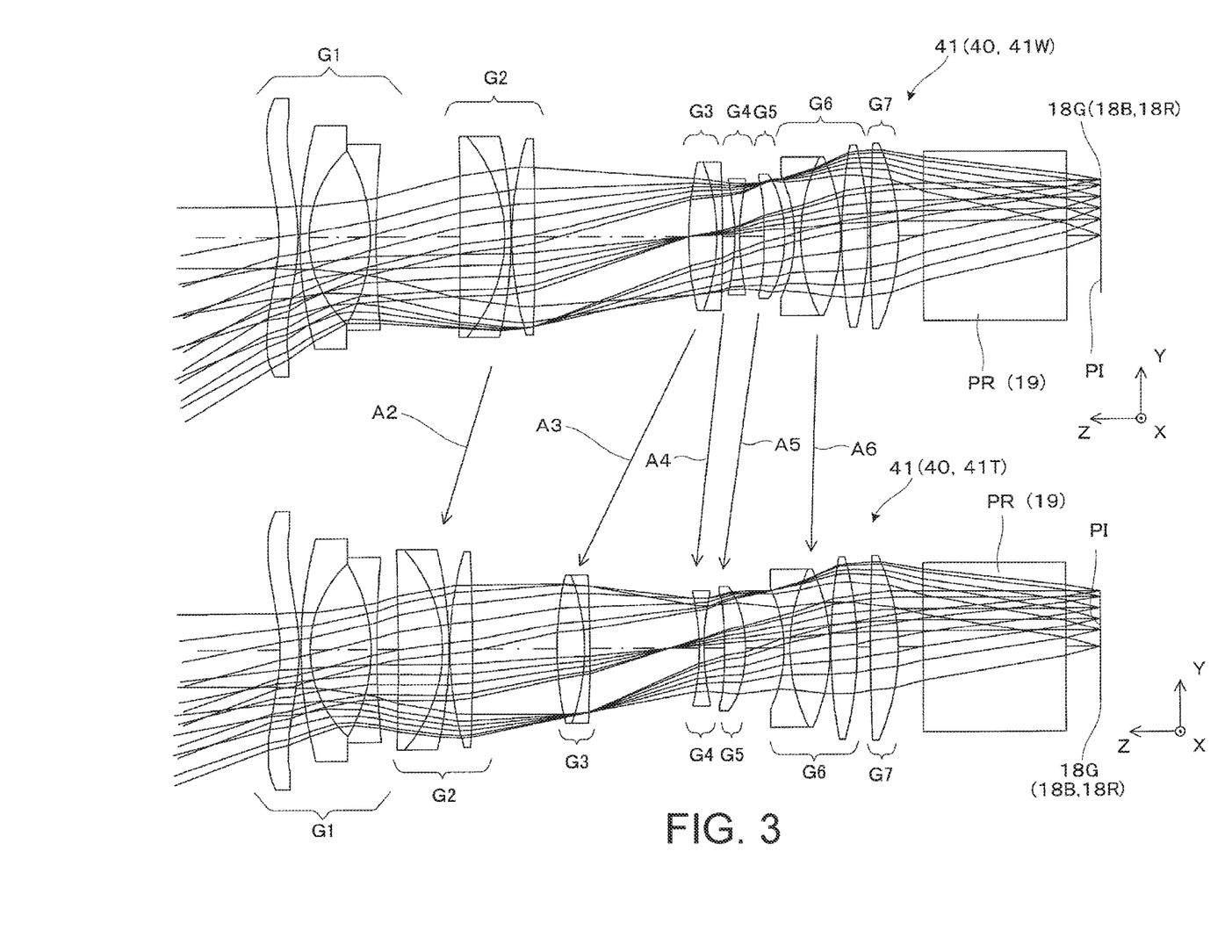
FIG. 3 describes zooming operation of the optical system according to the embodiment or Example 1.

The zooming operation of the projection system 40 according to the present embodiment will be described below with reference to FIG. 3. In FIG. 3, the upper portion shows the positions where the lenses are located when the projection system 40 operates at a wide-angle end (Wide), and the lower portion shows the positions where the lenses are located when the projection system 40 operates at a telescopic end (Tele). That is, the upper portion shows the lens arrangement of the projection system 40 (projection system 41W) operating at the wide-angle end, and the lower portion shows the lens arrangement of the projection system 40 (projection system 41T) operating at the telescopic end. Out of the lens groups G1 to G7, which are the optical systems that form the projection system 40 according to the present embodiment, the first lens group G1 and the seventh lens group G7 are fixed or substantially fixed when the magnification is changed from the wide-angle end to the telescopic end, as shown in FIG. 3. On the other hand, the second lens group G2 to the sixth lens group G6 move in the change in magnification, as indicated by the arrows A2 to A6 in FIG. 3. In this case, since the first lens group G1 and the seventh lens group G7 are located at the opposite ends and fixed or substantially fixed, the precision of the optical axis of the projection system 40 as a whole is readily increased, whereby a high-quality projected image can be produced.

As described above, in the projection system 40 according to the present embodiment and the projector 100, which incorporates the projection system 40, which is formed of the seven lens groups of the first to seventh groups G1 to G7, whose refractive power (power) is negative, positive, positive, negative, positive, positive, and positive from the enlargement side, the power arrangement is so set that the negative power occurs in a portion shifted toward the enlargement side with the conditional expression (1) satisfied. A back focal length long enough to dispose the cross prism and other components can therefore be ensured with necessary optical performance maintained.

EXAMPLES

Examples of the projection system 40 will be described below. The meanings of a variety of parameters common to Examples 1 and 2, which will be described below, are summarized below.

f: Focal length of entire optical system
FNo: f number
R: Radius of curvature
D: On-axis inter-surface space (thickness of lens or space between lenses)
nd: Refractive index at d line
vd: Abbe number at d line (dispersion value)
vdR: Abbe number of lens closest to reduction side (dispersion value)
vdF: Abbe number of lens closest to enlargement side (dispersion value)

An aspheric surface is identified by the following polynomial (expression of aspheric surface):

$$z = \frac{ch^2}{1+\sqrt{1-(k+1)c^2h^2}} + A_4 h^4 + A_6 h^6 + A_8 h^8 + A_{10} h^{10} + A_{12} h^{12} + A_{14} h^{14}$$

The parameters in the polynomial are as follows:
c: Curvature (1/R)
h: Height from optical axis
k: Conic coefficient of aspheric surface
Ai: Higher-order aspheric coefficient of aspheric surface The last surface number stands for the reduction-side surface of the prism PR. A surface having a surface number followed by "*" is a surface having an aspheric shape.

Example 1

Table 1 shown below shows data on the lens surfaces in Example 1.

TABLE 1

Lens data

| Surface number | R | D | nd | vd |
|---|---|---|---|---|
| 1(*) | −32.388 | 3.80 | 1.50942 | 55.88 |
| 2(*) | −36.84 | 0.40 | | |
| 3 | 85.753 | 2.00 | 1.49700 | 81.54 |
| 4 | 23.295 | 12.30 | | |
| 5 | −32.277 | 1.20 | 1.49700 | 81.54 |
| 6 | 176.971 | variable | | |
| 7 | −19221.1 | 9.22 | 1.83400 | 37.16 |
| 8 | −29.177 | 1.30 | 1.84666 | 23.78 |
| 9 | −87.595 | 0.20 | | |
| 10 | 70.26 | 4.56 | 1.84666 | 23.78 |
| 11 | −400.911 | variable | | |
| 12 | 63.847 | 5.67 | 1.77250 | 49.60 |
| 13 | −41.475 | 1.10 | 1.78470 | 26.29 |
| 14 | −346.683 | variable | | |
| 15 | −46.338 | 1.00 | 1.71736 | 29.52 |
| 16 | 53.398 | variable | | |
| 17(*) | −113.884 | 4.36 | 1.74320 | 49.29 |
| 18(*) | −27.087 | variable | | |
| 19 | −27.432 | 1.2 | 1.69895 | 30.13 |
| 20 | 33.481 | 8.25 | 1.49700 | 81.54 |
| 21 | −36.343 | 0.20 | | |
| 22 | 99.62 | 5.05 | 1.80809 | 22.76 |
| 23 | −77.605 | variable | | |
| 24 | 268.025 | 5.98 | 1.49700 | 81.54 |
| 25 | −42.479 | 5.00 | | |
| 26 | infinity | 28.82 | 1.51630 | 64.14 |
| 27 | infinity | 6.685 | | |

| Surface number | 1 | 2 | 17 | 18 |
|---|---|---|---|---|
| k | −7.520 | −8.149 | −1.840 | 0.592 |
| A4 | 1.884E−05 | 1.867E−05 | −1.821E−05 | −4.586E−06 |
| A6 | −3.042E−08 | −3.362E−08 | −1.084E−08 | −9.462E−09 |
| A8 | 4.141E−11 | 4.668E−11 | −8.305E−10 | −3.565E−10 |
| A10 | −3.542E−14 | −4.293E−14 | 2.863E−14 | −1.821E−12 |
| A12 | 2.387E−17 | 4.143E−17 | 1.062E−14 | 2.926E−14 |
| A14 | −5.701E−21 | −1.671E−20 | −2.200E−16 | −1.729E−16 |

(*)Data on aspheric surface

In Table 1 shown above and the following tables, 10 raised to some power ($1.00 \times 10^{+18}$, for example) is expressed by using E (1.00E+18, for example).

Figure 2:
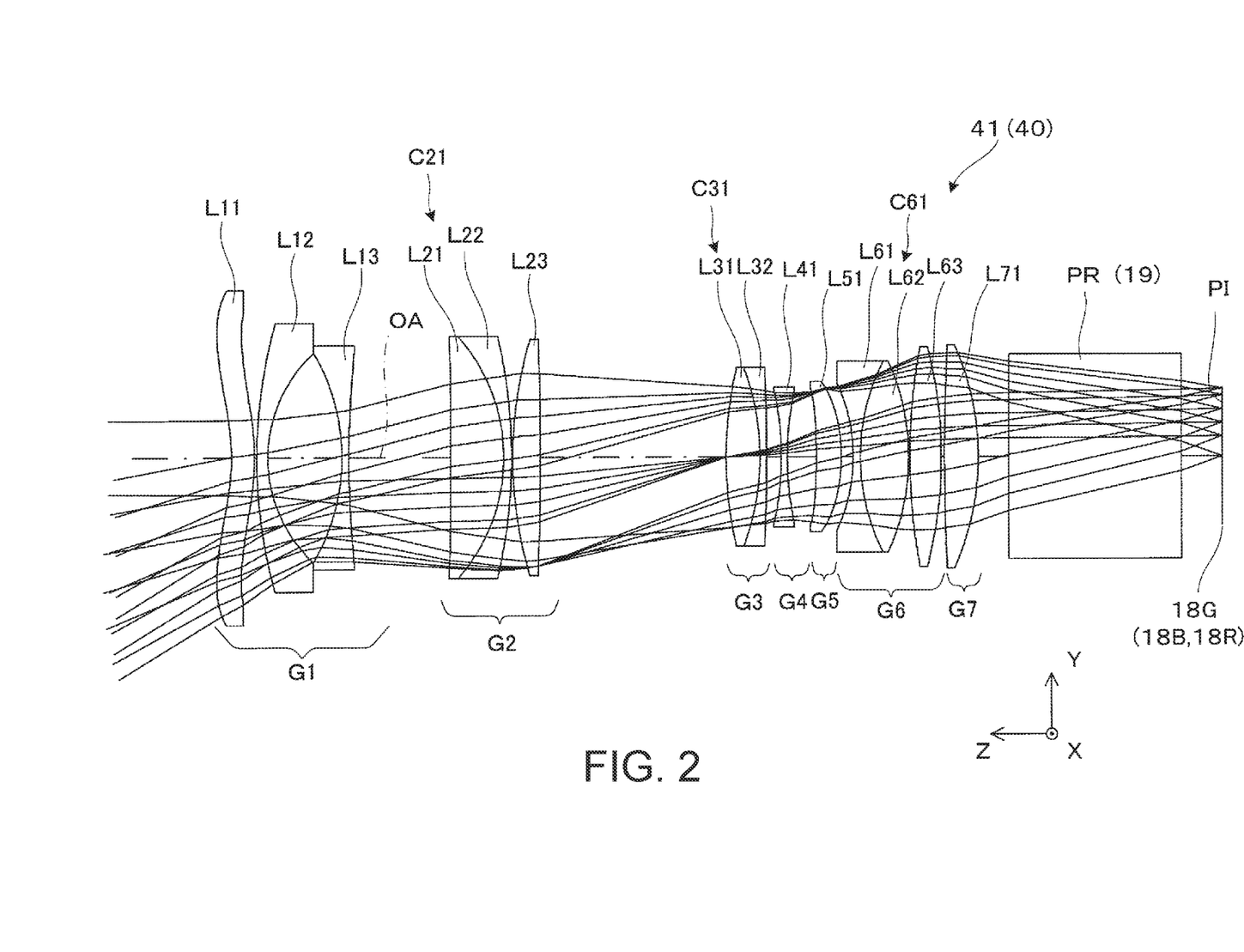
FIG. 2 shows the configuration of the projection system according to the embodiment or Example 1.

FIGS. 2 and 3 shown as an embodiment of the projection system also correspond to cross-sectional views of the projection system 41 (projection system 40) according to Example 1.

Table 2 shown below shows an on-axis inter-surface space D at each variable space location at a corresponding lens surface in Example 1 in a case where the entire projection system 41 (projection system 40) operates at each of the wide-angle end and the telescopic end including the cases where the magnification is changed to the values corresponding the wide-angle end (Wide) and the telescopic end (Tele) in Example 1 shown in FIG. 3. Table 2 further shows, as characteristic values, the ranges of the focal length f and the F number FNo of the entire projection system 41 (projection system 40) and the difference between the Abbe number (dispersion value) vdR of the lens closest to the reduction side and the Abbe number (dispersion value) vdF of the lens closest to the enlargement side.

TABLE 2

| | Variable space | |
|---|---|---|
| | WIDE | TELE |
| Surface number | | |
| 6 | 16.13 | 4.18 |
| 11 | 29.70 | 15.79 |
| 14 | 2.51 | 22.43 |
| 16 | 5.08 | 4.00 |
| 18 | 1.96 | 7.98 |
| 23 | 0.50 | 2.31 |
| Characteristic values | | |
| Focal length (f) | 18.5 | 29.64 |
| F number (FNo) | 1.5 | 1.99 |
| vdR − vdF | 25.66 | |

The projection system 41 according to Example 1 shown in FIGS. 2 and 3 (corresponding to projection system 40) enlarges and projects an image on a panel surface PI at the magnification corresponding to the distance to the screen. In particular, in FIG. 3, the upper portion shows the positions where the lenses are located when the projection system 41 operates at the wide-angle end, and the lower portion shows the positions where the lenses are located when the projection system 41 operates at the telescopic end. That is, the upper portion shows the lens arrangement of the projection system 41 (projection system 41W) operating at the wide-angle end, and the lower portion shows the lens arrangement of the projection system 41 (projection system 41T) operating at the telescopic end. FIG. 3 therefore shows, as a whole, movement of the projection system 41 in the change in magnification from the wide-angle end to the telescopic end.

In the projection system 41, the first lens group G1 and the seventh lens group G7 are fixed in zooming and focusing operation, as indicated by the lens data in Tables and shown in FIG. 3. On the other hand, the second lens group G2 to the sixth lens group G6 move from positions on the reduction side to positions on the enlargement side in the zooming operation from the wide-angle end to the telescopic end.

Referring back to FIG. 2, the lenses that form the projection system 41 will each be described below in detail.

The first lens group G1 is formed of three lenses, a first lens (lens L11) that is a negative meniscus lens having a concave surface facing the enlargement side, a second lens (lens L12) that is a negative meniscus lens having a convex surface facing the enlargement side, and a third lens (lens L13) that is a biconcave lens. Out of the lenses described above, the first lens (lens L11) is a resin molded lens having aspheric surfaces on opposite sides.

The second lens group G2 is formed of three lenses, a fourth lens (lens L21) that is a positive meniscus lens having a concave surface facing the enlargement side, a fifth lens (lens L22) that is a negative meniscus lens having a concave surface facing the enlargement side, which form the doublet C21, and a sixth lens (lens L23) that is the biconvex lens.

The third lens group G3 is formed of two lenses, a seventh lens (lens L31) that is a biconvex lens and an eighth lens (lens L32) that is a negative meniscus lens having a concave surface facing the enlargement side, which forms the doublet C31.

The fourth lens group G4 is formed of one lens, a ninth lens (lens L41) that is a biconcave lens.

The fifth lens group G5 is formed of one lens, a tenth lens (lens L51) that is a positive meniscus lens having a concave surface facing the enlargement side. The tenth lens (lens L51) is a glass molded lens having aspheric surfaces on opposite sides.

The sixth lens group G6 is formed of three lenses, an eleventh lens (lens L61) that is a biconcave lens, a twelfth lens (lens L62) that is a biconvex lens, which form the doublet C61, and a thirteenth lens (lens L63) that is a biconvex lens. That is, the sixth lens group G6 is formed of the combination of a doublet formed of a biconcave lens and a biconvex lens bonded to each other and a convex lens sequentially arranged from the enlargement side.

The seventh lens group G7 is formed of one lens, a fourteenth lens (lens L71) that is a biconvex lens.

That is, the projection system 41 is formed of the fourteen lenses. The fourteen lenses L11 to L13, L21 to L23, L31 and L32, L41, L51, L61 to L63, and L71 each have a circular shape axially symmetric around the optical axis OA. Out of the fourteen lenses, the first lens L11 and the tenth lens L51 each have aspheric surfaces on opposite sides. The other surfaces are all spherical surfaces.

Figure 4:
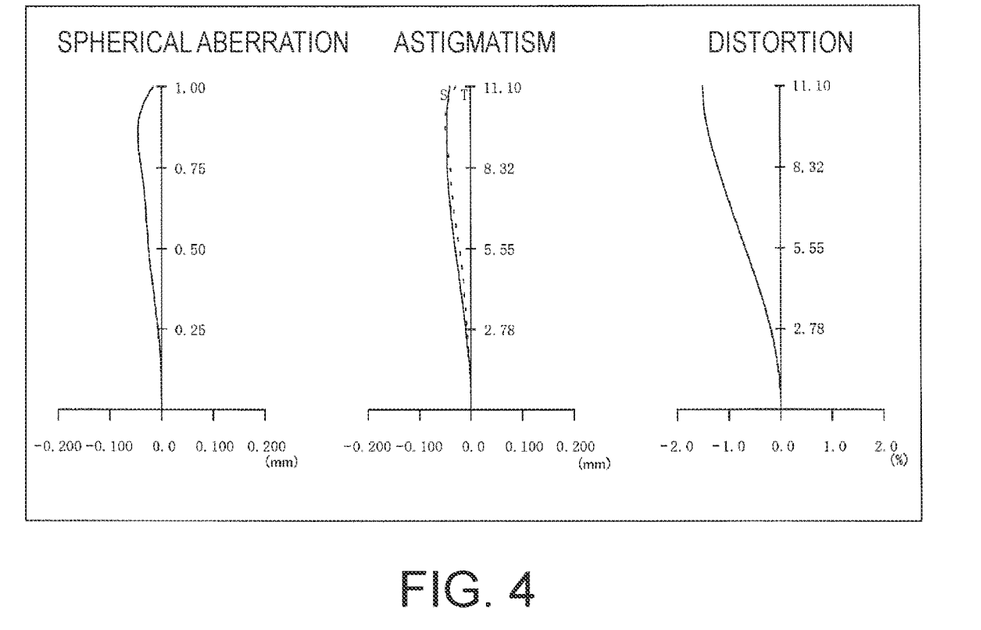
FIG. 4 is a reduction-side aberration diagram of the projection system according to Example 1.
Figure 5:
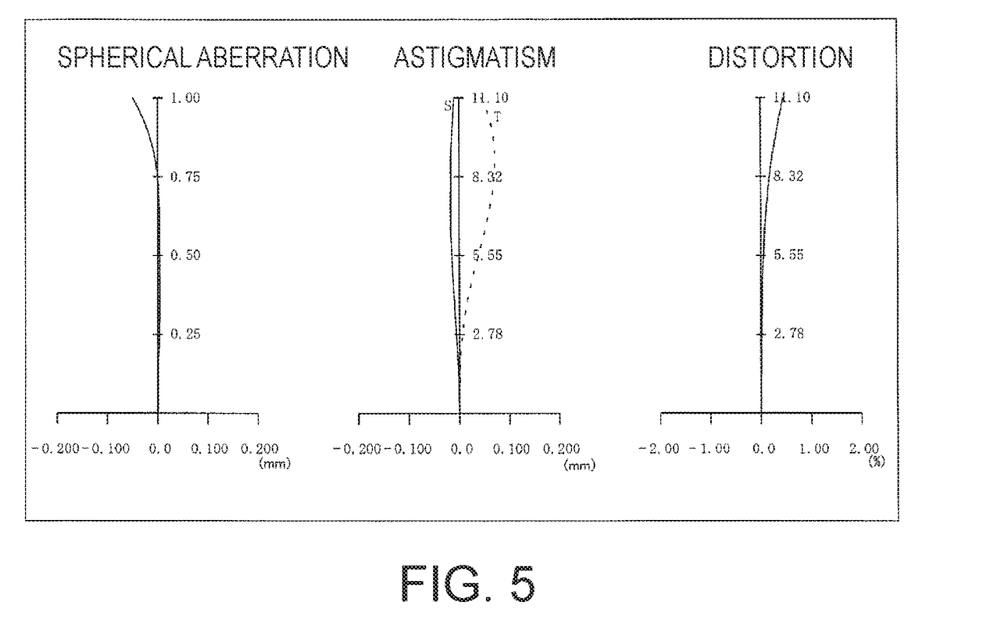
FIG. 5 is a reduction-side aberration diagram of the projection system according to Example 1.

FIGS. 4 and 5 are each a reduction-side aberration diagram of the projection system. FIG. 4 shows aberrations that occur at the wide-angle end, and FIG. 5 shows the aberrations that occur at the telescopic end. Further, FIGS. 4 and 5 each show the spherical aberration, the astigmatism, and the distortion sequentially from the left. The aberrations shown in FIGS. 4 and 5 are those at a reference wavelength of 550 nm.

Example 2

Table 4 shown below shows data on the lens surfaces in Example 2.

TABLE 4

| Lens data | | | | |
|---|---|---|---|---|
| Surface number | R | D | nd | vd |
| 1(*) | −30.936 | 3.80 | 1.50942 | 55.88 |
| 2(*) | −35.909 | 0.40 | | |
| 3 | 81.700 | 2.00 | 1.49700 | 81.54 |
| 4 | 22.983 | 12.40 | | |
| 5 | −31.218 | 1.20 | 1.49700 | 81.54 |
| 6 | 118.382 | variable | | |
| 7 | 176.013 | 10.15 | 1.83400 | 37.16 |
| 8 | −29.894 | 1.30 | 1.84666 | 23.78 |
| 9 | −103.471 | 0.20 | | |
| 10 | 83.276 | 4.32 | 1.84666 | 23.78 |

TABLE 4-continued

| Lens data | | | | |
|---|---|---|---|---|
| 11 | −298.531 | variable | | |
| 12 | 63.555 | 5.58 | 1.77250 | 49.60 |
| 13 | −43.025 | 1.10 | 1.72825 | 28.46 |
| 14 | 1804.821 | variable | | |
| 15 | −38.344 | 1.00 | 1.76182 | 26.52 |
| 16 | 75.191 | variable | | |
| 17(*) | −217.035 | 4.36 | 1.74320 | 49.29 |
| 18(*) | −29.418 | variable | | |
| 19 | −32.019 | 1.20 | 1.69895 | 30.13 |
| 20 | 34.780 | 7.55 | 1.49700 | 81.54 |
| 21 | −41.769 | 0.20 | | |
| 22 | 87.938 | 4.85 | 1.80809 | 22.76 |
| 23 | −86.874 | variable | | |
| 24 | 170.537 | 5.17 | 1.59522 | 67.74 |
| 25 | −55.330 | 5.00 | | |
| 26 | infinity | 28.82 | 1.51630 | 64.14 |
| 27 | infinity | 6.48 | | |

| Surface number | 1 | 2 | 17 | 18 |
|---|---|---|---|---|
| K | −7.430 | −8.549 | −2.000 | 0.552 |
| A4 | 1.814E−05 | 1.763E−05 | −1.502E−05 | −4.714E−06 |
| A6 | −3.054E−08 | −3.378E−08 | −9.047E−10 | −3.490E−09 |
| A8 | 4.119E−11 | 4.712E−11 | −8.308E−10 | −4.130E−10 |
| A10 | −3.544E−14 | −4.347E−14 | 2.517E−12 | −1.756E−12 |
| A12 | 2.399E−17 | 3.962E−17 | 1.440E−14 | 3.115E−14 |
| A14 | −6.586E−21 | −1.602E−20 | −2.073E−16 | −1.736E−16 |

(*)Data on aspheric surface

Figure 6:
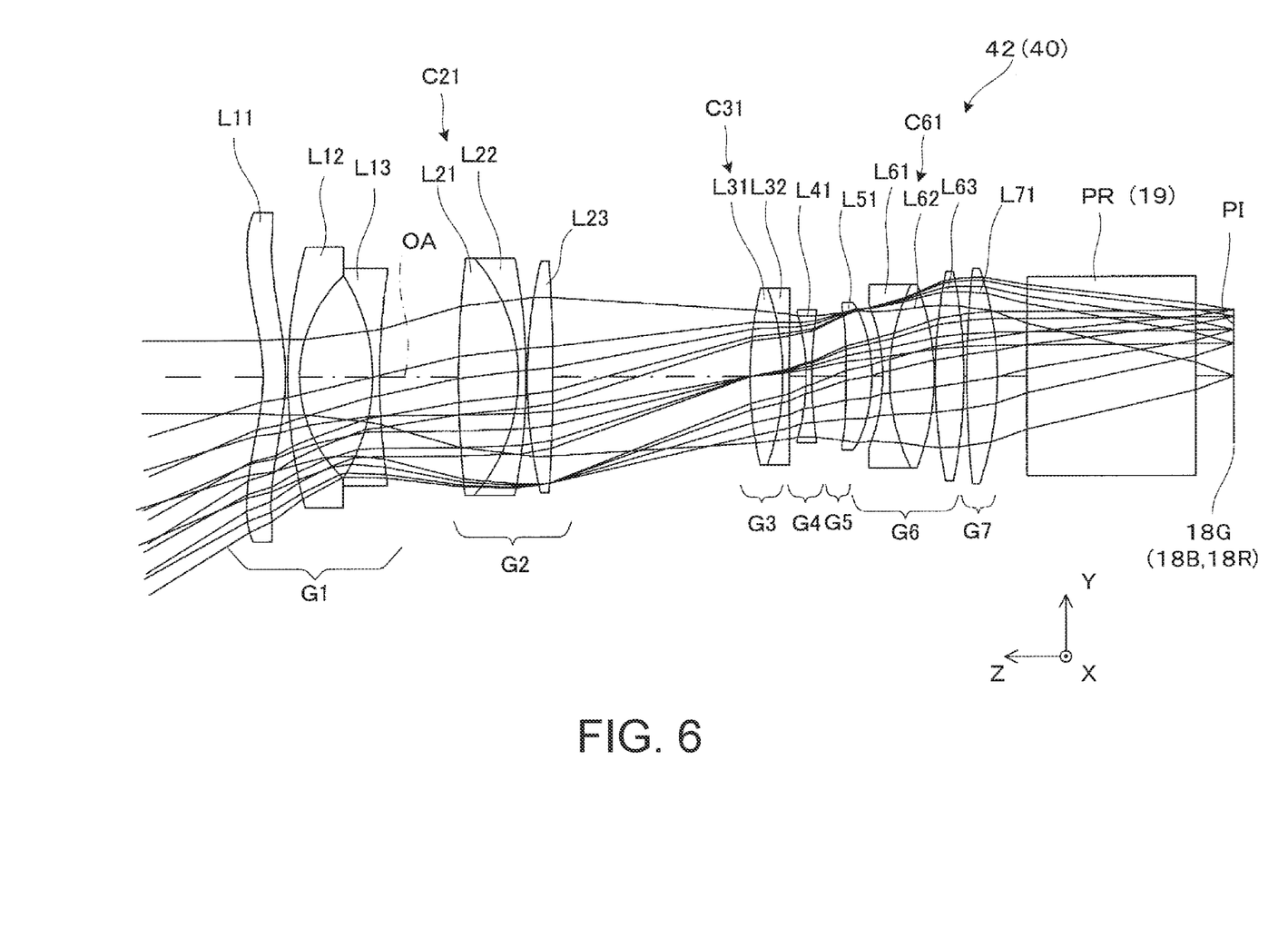
FIG. 6 shows the configuration of a projection system according to Example 2.
Figure 7:
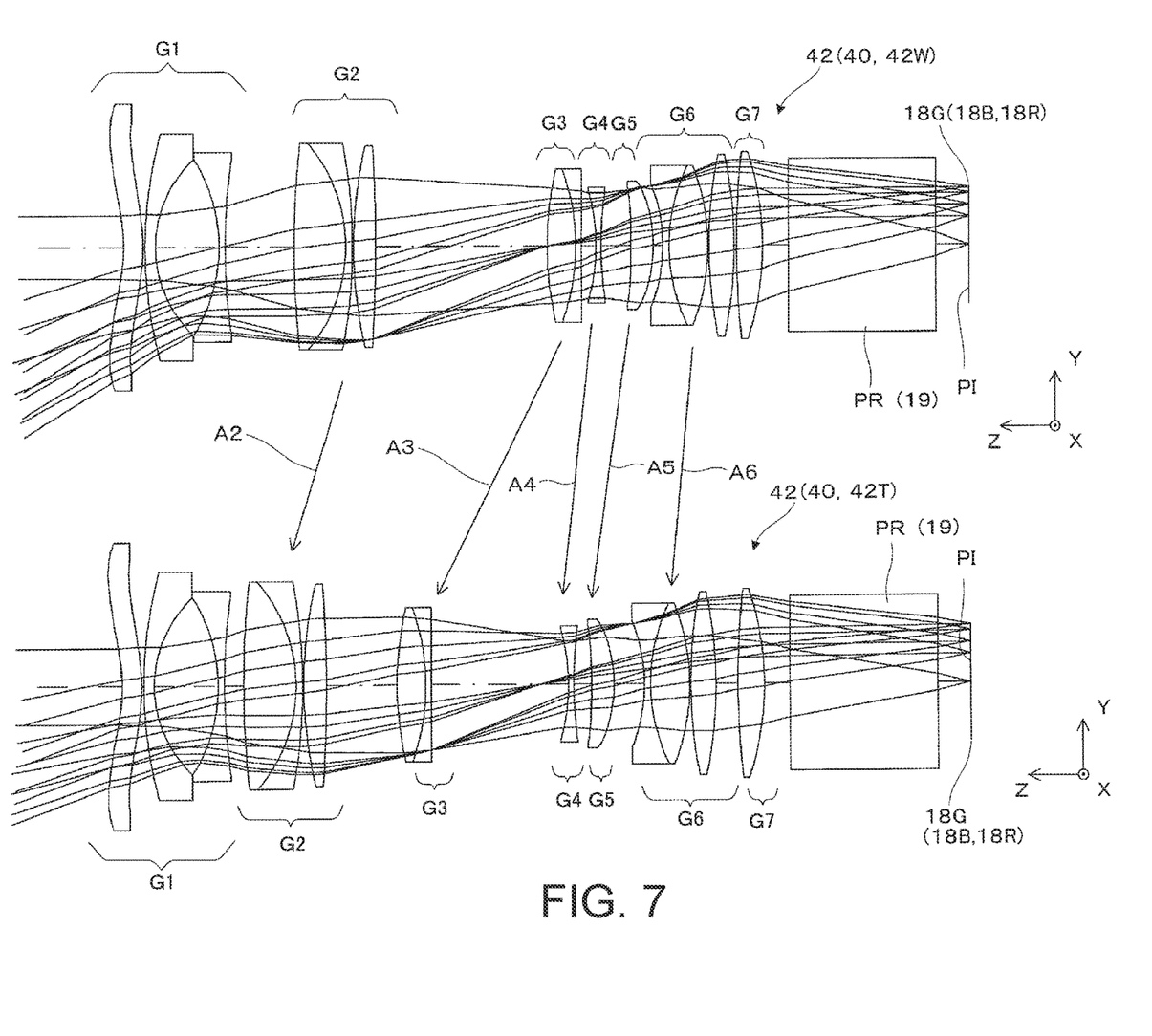
FIG. 7 describes zooming operation of the optical system according to Example 2.

FIGS. 6 and 7 are cross-sectional views of a projection system 42 (projection system 40) according to Example 2 and correspond to FIGS. 2 and 3 in Example 1.

Table 5 shown below shows an on-axis inter-surface space D at each variable space location at a corresponding lens surface in Example 2 in a case where the entire projection system 42 (projection system 40) operates at each of the wide-angle end and the telescopic end including the cases where the magnification is changed to the values corresponding the wide-angle end (Wide) and the telescopic end (Tele) in Example 2 shown in FIG. 7. Table 5 further shows, as the characteristic values, the ranges of the focal length f and the F number FNo of the entire projection system 42 (projection system 40) and the difference between the Abbe number (dispersion value) vdR of the lens closest to the reduction side and the Abbe number (dispersion value) vdF of the lens closest to the enlargement side.

TABLE 5

| Variable space | | |
|---|---|---|
| | WIDE | TELE |
| Surface number | | |
| 6 | 13.384 | 3.747 |
| 11 | 33.534 | 13.816 |
| 14 | 2.873 | 26.709 |
| 16 | 5.832 | 3.454 |
| 18 | 1.830 | 5.922 |
| 23 | 0.500 | 4.302 |
| Characteristic values | | |
| Focal length (f) | 18.51 | 29.64 |
| F number (FNo) | 1.49 | 1.98 |
| vdR − vdF | 11.82 | |

The projection system 42 according to Example 2 shown in FIGS. 6 and 7 (corresponding to projection system 40) enlarges and projects an image on the panel surface PI at the magnification corresponding to the distance to the screen. In particular, in FIG. 7, the upper portion shows the positions where the lenses are located when the projection system 42 operates at the wide-angle end, and the lower portion shows the positions where the lenses are located when the projection system 42 operates at the telescopic end. That is, the upper portion shows the lens arrangement of the projection system 42 (projection system 42W) operating at the wide-angle end, and the lower portion shows the lens arrangement of the projection system 42 (projection system 42T) operating at the telescopic end. FIG. 7 therefore shows, as a whole, movement of the projection system 42 in the change in magnification from the wide-angle end to the telescopic end.

In the projection system 42, the first lens group G1 and the seventh lens group G7 are fixed in zooming and focusing operation, as indicated by the lens data in Tables and shown in FIG. 7. On the other hand, the second lens group G2 to the sixth lens group G6 move from positions on the reduction side to positions on the enlargement side in the zooming operation from the wide-angle end to the telescopic end.

Referring back to FIG. 6, the lenses that form the projection system 42 will each be described below in detail.

The first lens group G1 is formed of three lenses, a first lens (lens L11) that is a negative meniscus lens having a concave surface facing the enlargement side, a second lens (lens L12) that is a negative meniscus lens having a convex surface facing the enlargement side, and a third lens (lens L13) that is a biconcave lens. Out of the lenses described above, the first lens (lens L11) is a resin molded lens having aspheric surfaces on opposite sides.

The second lens group G2 is formed of three lenses, a fourth lens (lens L21) that is a biconvex lens, a fifth lens (lens L22) that is a negative meniscus lens having a concave surface facing the enlargement side, which form the doublet C21, and a sixth lens (lens L23) that is the biconvex lens.

The third lens group G3 is formed of two lenses, a seventh lens (lens L31) that is a biconvex lens and an eighth lens (lens L32) that is a biconcave lens, which forms the doublet C31.

The fourth lens group G4 is formed of one lens, a ninth lens (lens L41) that is a biconcave lens.

The fifth lens group G5 is formed of one lens, a tenth lens (lens L51) that is a positive meniscus lens having a concave surface facing the enlargement side. The tenth lens (lens L51) is a glass molded lens having aspheric surfaces on opposite sides.

The sixth lens group G6 is formed of three lenses, an eleventh lens (lens L61) that is a biconcave lens, a twelfth lens (lens L62) that is a biconvex lens, which form the doublet C61, and a thirteenth lens (lens L63) that is a biconvex lens.

The seventh lens group G7 is formed of one lens, a fourteenth lens (lens L71) that is a biconvex lens.

That is, the projection system 42 is formed of the fourteen lenses. The fourteen lenses L11 to L13, L21 to L23, L31 and L32, L41, L51, L61 to L63, and L71 each have a circular shape axially symmetric around the optical axis OA. Out of the fourteen lenses, the first lens L11 and the tenth lens L51 each have aspheric surfaces on opposite sides. The other surfaces are all spherical surfaces.

Figure 8:
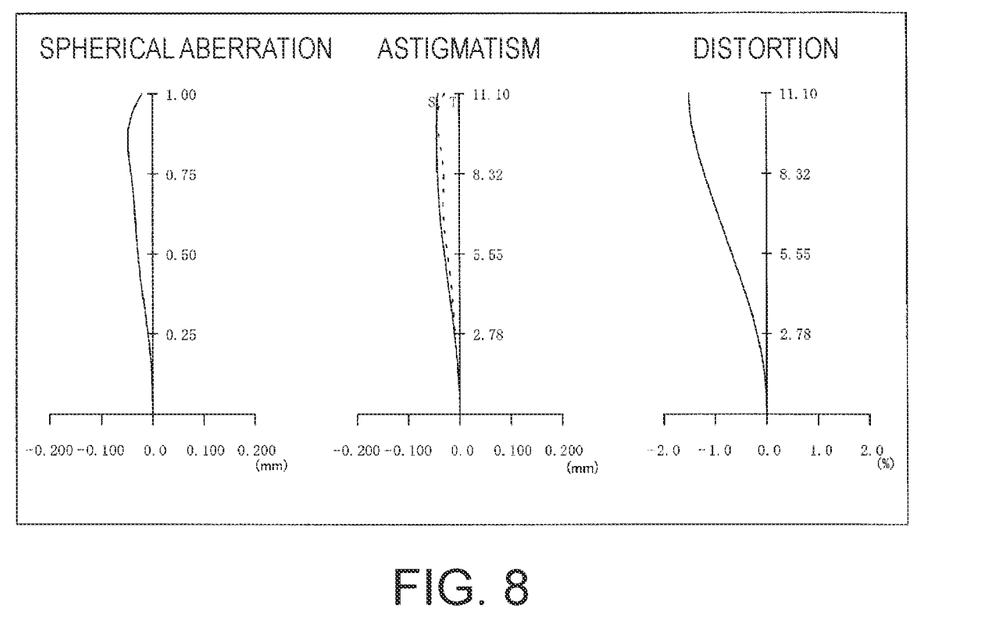
FIG. 8 is a demagnifying-side aberration diagram of the projection system according to Example 2.
Figure 9:
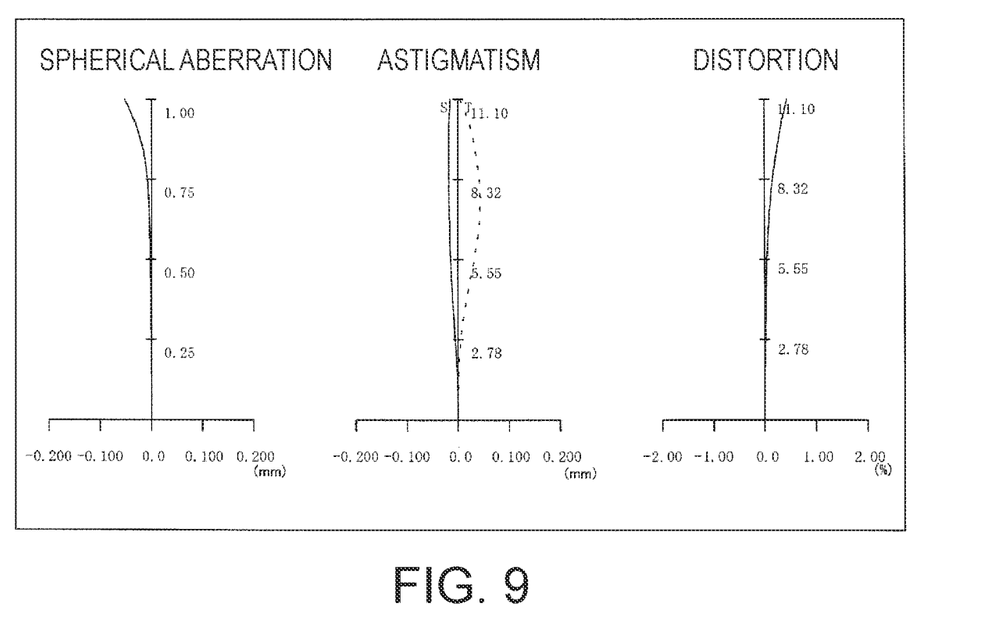
FIG. 9 is a demagnifying-side aberration diagram of the projection system according to Example 2.

FIGS. 8 and 9 are each a reduction-side aberration diagram of the projection system. FIG. 8 shows aberrations that occur at the wide-angle end, and FIG. 9 shows the aberrations that occur at the telescopic end. Further, FIGS. 8 and 9 each show the spherical aberration, the astigmatism, and the distortion sequentially from the left. The aberrations shown in FIGS. 8 and 9 are those at the reference wavelength of 550 nm.

SUMMARY OF EXAMPLES

Examples 1 and 2 satisfy the range (condition) expressed by the conditional expression which indicates the difference between the Abbe number (dispersion value) vdR of the lens closest to the reduction side and the Abbe number (dispersion value) vdF of the lens closest to the enlargement side $$5 < vdR - vdF < 30. \tag{1}$$

(The difference is 25.66 in Example 1, and the difference is 11.82 in Example 2.)

As described above, in the projection system (zoom lens for projection) according to the present embodiment or the projector (projection-type image display apparatus) using the projection system, the lens groups that form the projection system have the seven-group configuration, which is formed of the seven lens groups G1 to G7, whose refractive power is negative, positive, positive, negative, positive, positive, and positive from the enlargement side, and in the case where the dispersion value vdR of the lens L71 closest to the reduction side in the seventh lens group G7 and the dispersion value vdF of the lens L11 closest to the enlargement side in the first lens group G1 satisfy the conditional expression (1) described above, negative refractive power (power) of the entire projection system occurs in a portion shifted toward the enlargement side, whereby the back focal length can be increased.

The invention is not limited to the embodiments or Examples described above and can be implemented in a variety of aspects to the extent that they do not depart from the substance of the invention.

For example, in each of Examples, at least one lens having substantially no power can be added on the upstream or downstream side of the lenses that form each of the lens groups or between any adjacent ones of the lenses that form each of the lens groups.

The target to be enlarged and projected by the projection system 40 is not limited to a transmissive liquid crystal panel, and an image formed by a reflective liquid crystal panel can be enlarged and projected by the projection system 40. As well as an image formed by a liquid crystal panel, an image formed by a light modulation device, such as a digital micromirror device, can be enlarged and projected by the projection system 40. Further, as the light combining prism, the cross prism (cross dichroic prism) 19 has been presented above by way of example, and it is conceivable to employ a TIR prism, a Phillips prism, or any other prism.

The entire disclosure of Japanese Patent Application No. 2016-226674, filed on Nov. 22, 2016 is expressly incorporated by reference herein.

What is claimed is:

1. A projection system comprising:
   seven lens groups sequentially arranged from an enlargement side, a first lens group having negative refractive power, a second lens group having positive refractive power, a third lens group having positive refractive power, a fourth lens group having negative refractive power, a fifth lens group having positive refractive power, a sixth lens group having positive refractive power, and a seventh lens group having positive refractive power,
   wherein vdR that is a dispersion value of a lens that forms the seventh lens group out of the seven lens groups and is closest to a reduction side and vdF that is a dispersion value of a lens that forms the first lens group out of the seven lens groups and is closest to the enlargement side satisfy a following conditional expression:

$$5<vdR-vdF<30.$$

2. The projection system according to claim 1, wherein the sixth lens group is formed of a combination of a biconcave lens and a biconvex lens bonded to each other to form a doublet and a convex lens sequentially arranged from the enlargement side.

3. The projection system according to claim 2, wherein an absolute value of a focal length of the doublet in the sixth lens group is greater than 50 mm.

4. The projection system according to claim 3, wherein the first lens group and the seventh lens group are fixed when magnification is changed from a wide-angle end to a telescopic end, and the second lens group to the sixth lens group move in the change in magnification.

5. A projector that incorporates the projection system according to claim 4.

6. A projector that incorporates the projection system according to claim 3.

7. The projection system according to claim 2, wherein the first lens group and the seventh lens group are fixed when magnification is changed from a wide-angle end to a telescopic end, and the second lens group to the sixth lens group move in the change in magnification.

8. A projector that incorporates the projection system according to claim 7.

9. A projector that incorporates the projection system according to claim 2.

10. The projection system according to claim 1, wherein a lens closest to the enlargement side in the first lens group is an aspheric lens made of a resin.

11. The projection system according to claim 10, wherein the first lens group and the seventh lens group are fixed when magnification is changed from a wide-angle end to a telescopic end, and the second lens group to the sixth lens group move in the change in magnification.

12. A projector that incorporates the projection system according to claim 11.

13. A projector that incorporates the projection system according to claim 10.

14. The projection system according to claim 1, wherein the fifth lens group is formed of an aspheric lens made of glass.

15. The projection system according to claim 14, wherein the first lens group and the seventh lens group are fixed when magnification is changed from a wide-angle end to a telescopic end, and the second lens group to the sixth lens group move in the change in magnification.

16. A projector that incorporates the projection system according to claim 15.

17. A projector that incorporates the projection system according to claim 14.

18. The projection system according to claim 1, wherein the first lens group and the seventh lens group are fixed when magnification is changed from a wide-angle end to a telescopic end, and the second lens group to the sixth lens group move in the change in magnification.

19. A projector that incorporates the projection system according to claim 18.

20. A projector that incorporates the projection system according to claim 1.

* * * * *